United States Patent [19]

Aondetto

[11] 4,382,573
[45] May 10, 1983

[54] VEHICLE SEAT SUPPORT WITH INCORPORATED DEVICE FOR DAMPING LONGITUDINAL ACCELERATION

[75] Inventor: Bernard Aondetto, Nogent sur Marne, France

[73] Assignee: Sable Freres International, Pantin, France

[21] Appl. No.: 208,510

[22] Filed: Nov. 20, 1980

[30] Foreign Application Priority Data

Nov. 27, 1979 [FR] France ............................ 79 29130

[51] Int. Cl.³ .......................................... F16M 13/00
[52] U.S. Cl. ................................. 248/561; 248/564; 248/588; 248/419; 248/421
[58] Field of Search .............. 248/419, 561, 563, 588, 248/574, 575, 564, 421

[56] References Cited

U.S. PATENT DOCUMENTS

| | | | |
|---|---|---|---|
| 2,151,156 | 3/1939 | Saunders et al. | 248/419 |
| 3,826,457 | 7/1974 | Huot de Longchamp | 248/421 |
| 3,897,036 | 7/1975 | Nyström | 248/575 |
| 4,029,283 | 6/1977 | Swenson et al. | 248/575 |
| 4,295,627 | 10/1981 | Graves | 248/564 |

Primary Examiner—Francis K. Zugel
Assistant Examiner—Michael F. Trettel
Attorney, Agent, or Firm—Hamilton, Renner & Kenner

[57] ABSTRACT

The support comprises means for elastic longitudinal positioning of the upper chassis carrying the seat, constituted by a first rigid element (51) which is fixed in the horizontal direction with a lower chassis for fixing on the vehicle and which is situated between two further rigid elements (42A, 42B) fixed in the horizontal direction with an upper chassis (2) carrying the seat, while two opposed elastic elements (52, 53) are interposed respectively between the said first rigid element and the two other rigid elements.

11 Claims, 8 Drawing Figures

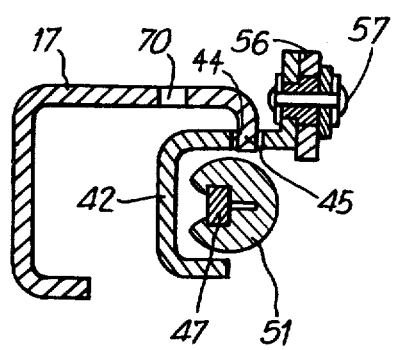
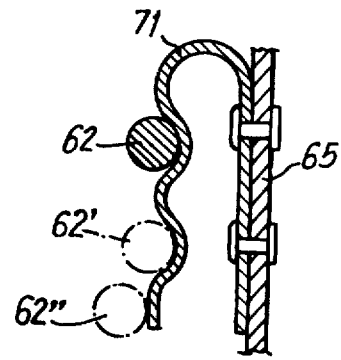
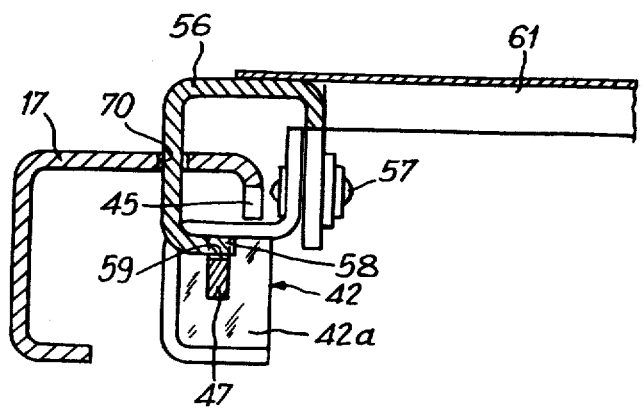

VEHICLE SEAT SUPPORT WITH INCORPORATED DEVICE FOR DAMPING LONGITUDINAL ACCELERATION

TECHNICAL FIELD

The invention relates to vehicle seat supports, especially for lorries, road or agricultural tractors, or public works implements, comprising a lower chassis for fixing upon the vehicle and an upper chassis intended to receive the seat and capable generally of sliding horizontally in the longitudinal direction in relation to the lower chassis for adjustment purposes.

BACKGROUND ART

With current development, the masses supported or drawn by such vehicles are greater and greater and parallel therewith the powers of their engines are ever increasing, so that during braking and acceleration their drivers are subjected to longitudinal horizontal components which can no longer be neglected; their effects can be as harmful as those of vertical force actions the damping of which has long already been effected by elastic suspension systems of the most various embodiments.

DISCLOSURE OF INVENTION

The purpose of the invention is to produce a vehicle seat support which provides a solution to this problem.

To this end according to the invention the assembly is equipped with elastic means for positioning of the upper chassis in the longitudinal direction, constituted by a first rigid element fixed in the longitudinal direction with one of the two chassis and situated between two further rigid elements which are fixed in the longitudinal direction with the other chassis and are connected respectively by two elastic elements to the said first rigid element.

With a seat support improved in this way the longitudinal horizontal forces acting upon the driver are considerably attenuated. Comfort can be further improved if a shock absorber of appropriate characteristics is added to the longitudinal elastic positioning device.

Furthermore, since the space available in the driving positions is particularly restricted, it is of interest to be able to group, in one and the same assembly, a whole series of functions such as suspension for absorbing vertical force actions, height adjustment of the seat and longitudinal adjustment of its positioning, as is already currently effected, but to these functions it is now possible, according to a further characteristic of the invention, to add in the same assembly the function of elastic longitudinal positioning of the seat, as will be seen below.

The invention will be better understood on reading of the following description and examination of the accompanying drawings, which show, by way of example, a form of embodiment of the invention applied to a device for elastic suspension of a vehicle seat with longitudinal adjustment.

BRIEF DESCRIPTION OF THE DRAWINGS

FIG. 4 is a partial cross-section along the broken line IV—IV in FIG. 3;

FIG. 5 is a partial longitudinal section along the line V—V in FIG. 2, on a larger scale;

FIG. 8 is a partial cross-section along the line VIII—VIII in FIG. 7.

PREFERRED EMBODIMENT FOR CARRYING OUT THE INVENTION

Figure 1:
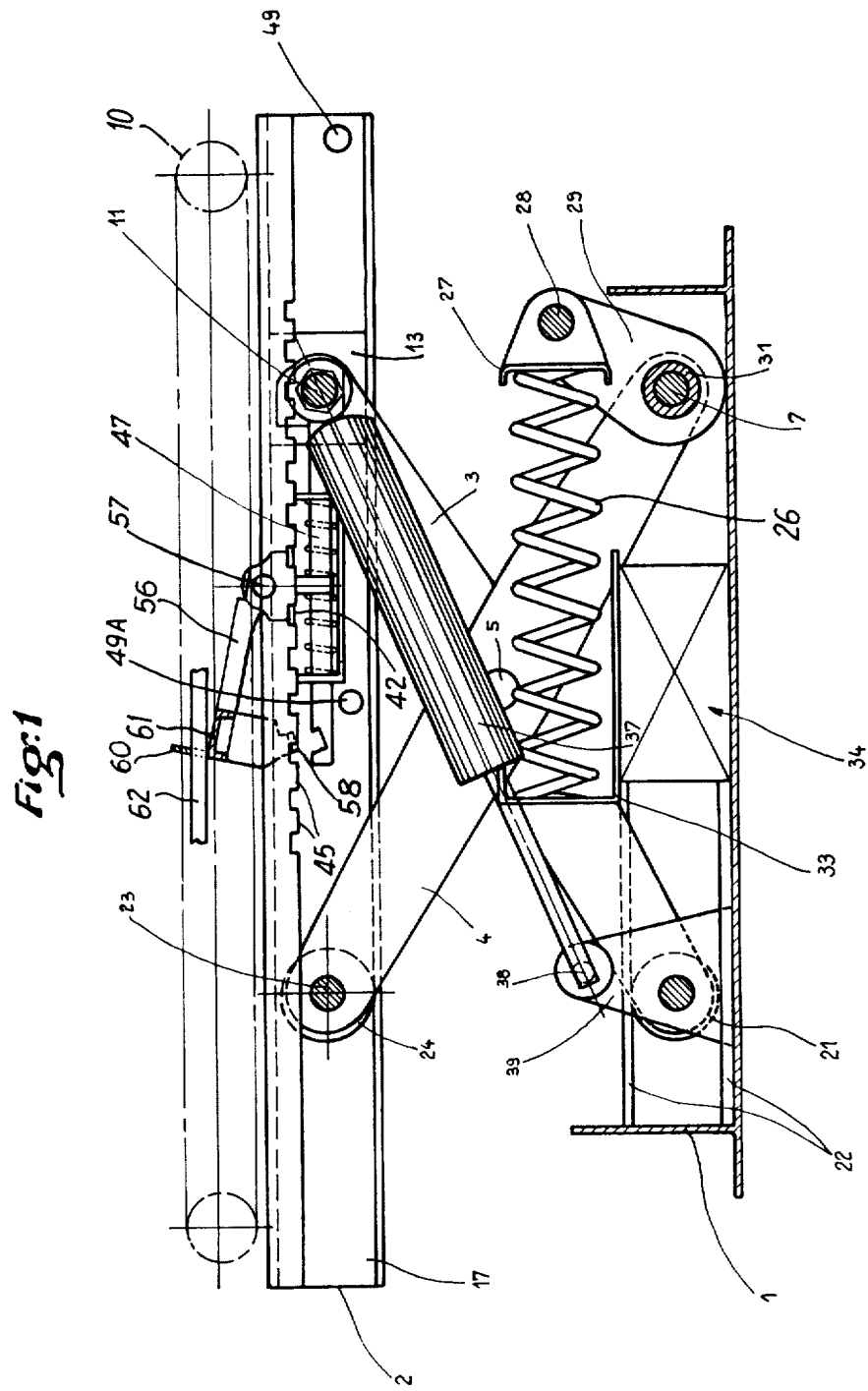
FIG. 1 is a longitudinal vertical section of the device along the line I—I in FIG. 2.
Figure 2:
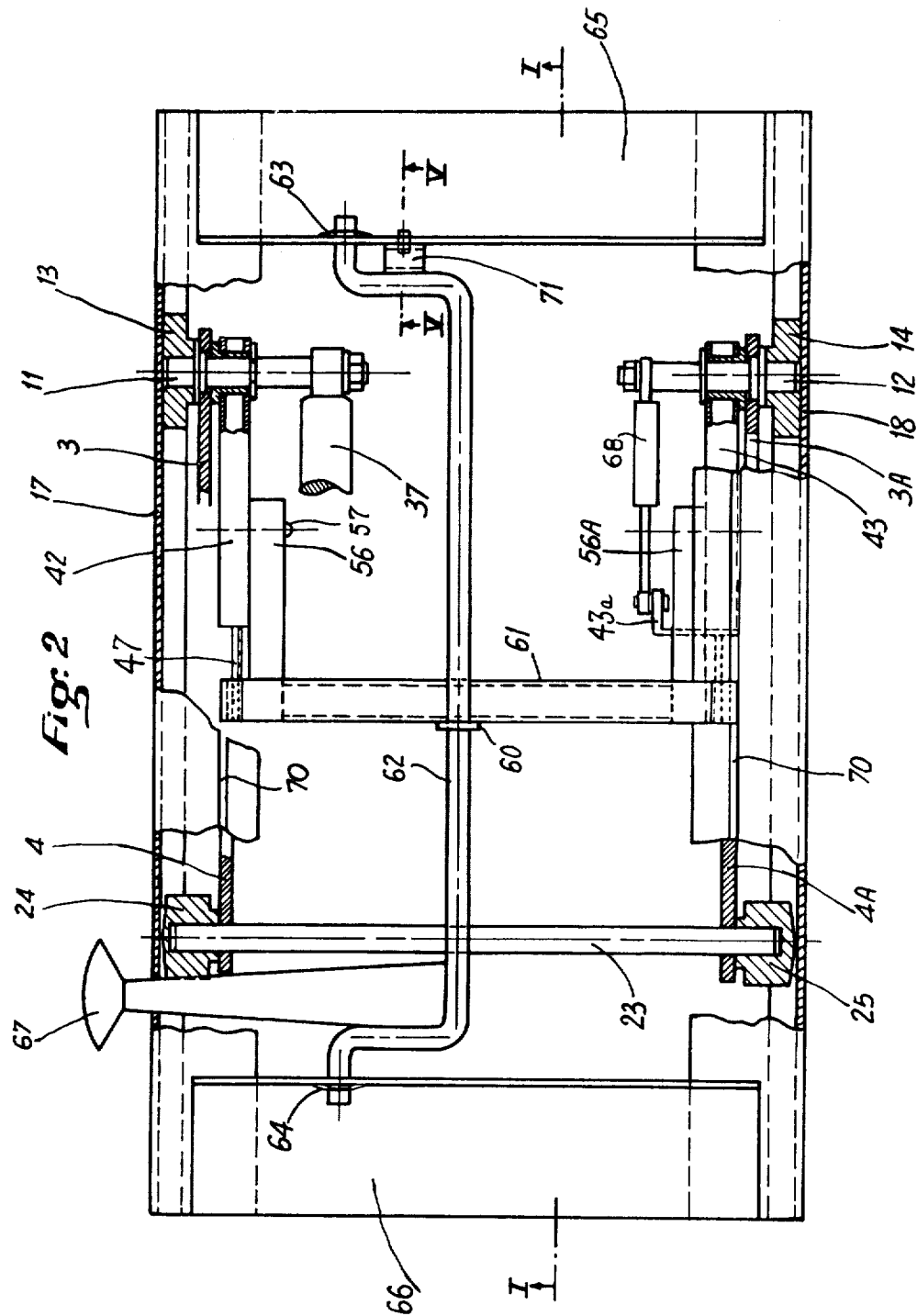
FIG. 2 is a plan view corresponding to FIG. 1, partly broken away.

The vehicle seat elastic suspension device with incorporated longitudinal adjustment as represented in FIGS. 1 and 2 comprises essentially a lower chassis 1 for fixing to the chassis of the vehicle, an upper chassis 2 intended to receive the seat (of which only the base 10 is represented), and means for guidance of the vertical displacement of the upper chassis in relation to the lower chassis, these means being constituted in the example by two pairs of scissor levers 3, 4 and 3A, 4A, all of the same length and articulated in pairs in their centers by two coaxial pivots such as 5. The lower extremities of the levers 4, 4A are pivotally mounted on a transverse horizontal spindle 7 carried by the lower chassis 1. The upper extremities of the levers 3, 3A are pivotally mounted on two transverse horizontal spindles 11, 12 carried respectively by two bearings 13, 14 constituted by two blocks or skids of plastic material which can slide respectively in two upper profiled slideways 17, 18 which form part of the upper chassis 2 and possess inwardly open horizontal U-sections with unequal legs, facing one another as may be seen in FIGS. 4 and 8 especially. The lower extremities of the two levers 3, 3A carry rollers such as 21 which roll respectively in two horizontal longitudinal slideways such as the slideway 22, fixed to the chassis 1 and likewise having facing horizontal U-shaped sections. In an analogous manner the upper extremities of the two levers 4, 4A carry rollers 24, 25 mounted on a common spindle 23 and rolling respectively in the two upper slideways 17, 18.

The upper chassis 2 is constantly thrust upwards by a compression spring 26 one extremity of which bears against a cup 27 pivotally mounted on the crank pin 28 of a crank 29 fixed on a tube 31 which is fitted over the spindle 7 and the two extremities of which are welded respectively to the lower extremities of the levers 4, 4A. The other end of the spring 26 bears against a support 33 forming part of a mechanism designated as a whole by 34, which is not represented in detail here but is for example of the type as described in the U.S. patent application filed by the applicant on Jan. 24, 1980 under Ser. No. 114,843 and entitled "A Device for the Resilient Suspension of Vehicle Seats". The mechanism 34 is mounted on the lower chassis 1.

A shock absorber 37 is articulated by its upper extremity to the spindle 11 and by its lower extremity to a spindle 38 fitted in a support 39 fixed on the lower chassis 1.

It can now be understood that whatever is the height position of the scissor lever suspension device, the upper chassis 2 can be caused to slide by its slideways 17, 18 on the rollers 24, 25 and on the bearings 13, 14 in the longitudinal direction, that is to say it is possible to move the seat forward or back as desired. Two stops 49, 49A fixed against the web of the upper slideway 17 limit the amplitude of the stroke in relation to the bearing 13 to the suitable value. Two similar stops can advantageously be disposed likewise on the other upper slideway 18.

Figure 3:
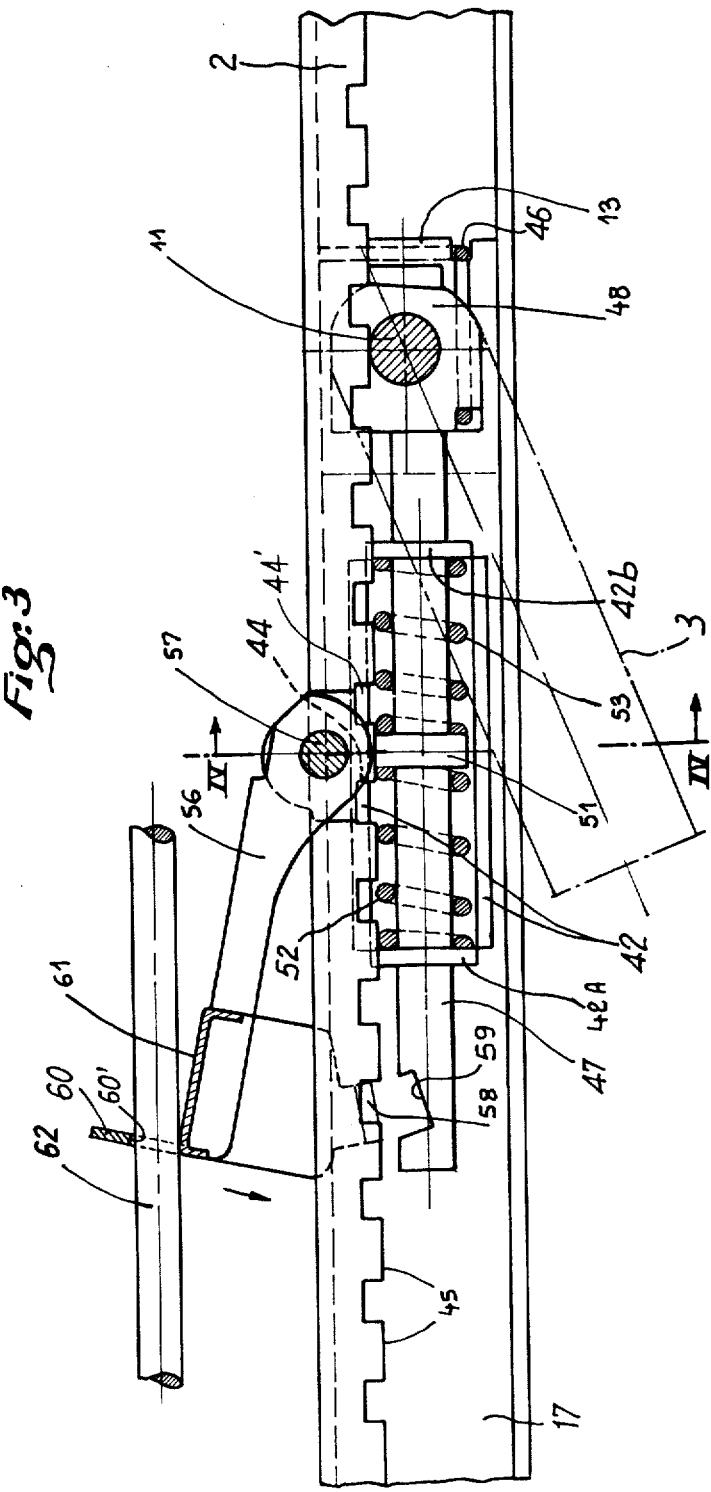
FIG. 3 shows the principal part of the mechanism in question, visible in FIG. 1, on a larger scale.
Figure 7:
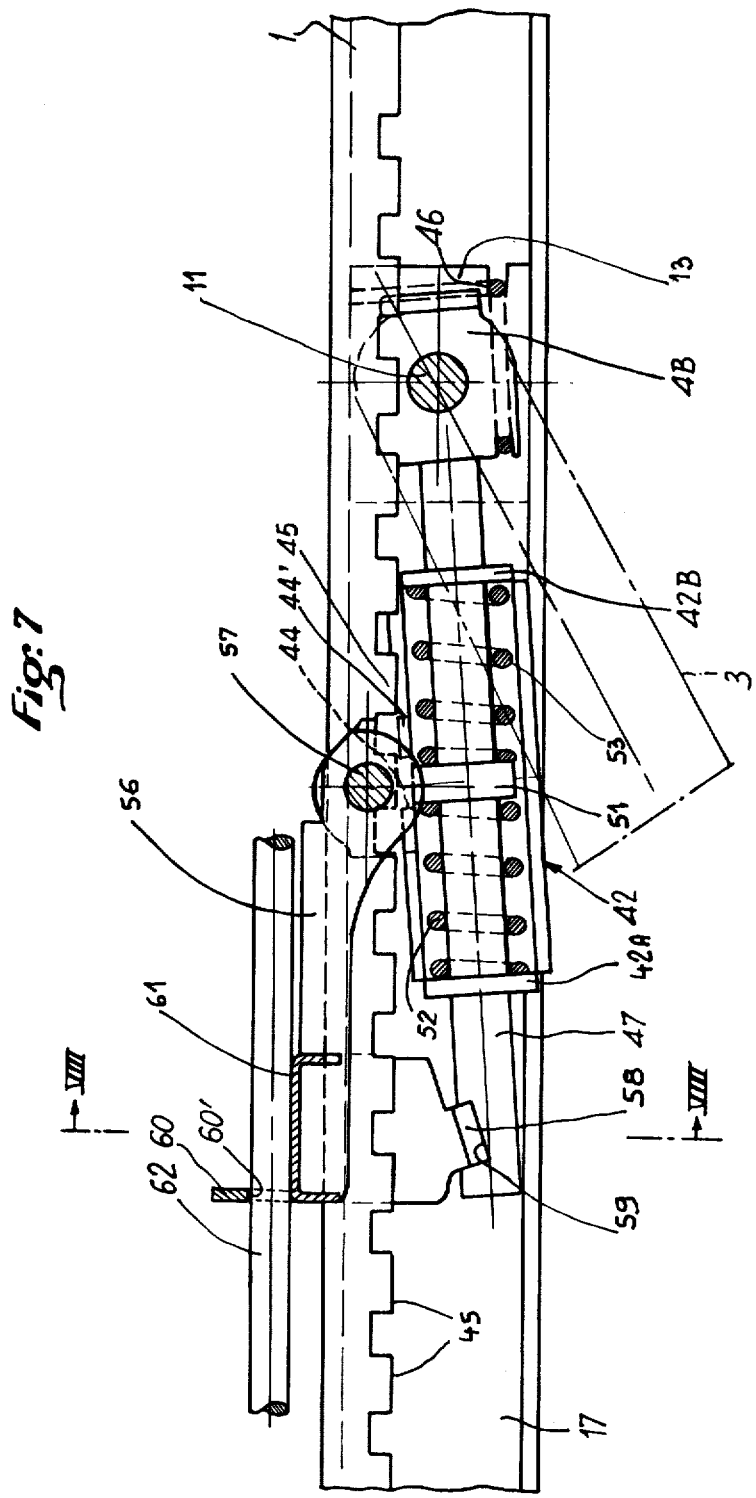

It must of course be possible to immobilize the seat in any desired longitudinal position. To this end a device is used of the same principle as that described in the United States patent application likewise filed by the applicant on May 20, 1980 under Ser. No. 151,615 and entitled "A Device for the Resilient Suspension of a Vehicle Seat with Longitudinal Adjustment". This device preferably comprises, on each side, a locking device 42 or 43 (see also FIGS. 3 and 4) which possesses a notch 44 defined between two side pieces 44' which form the upper face of the locking device 42 and capable of engaging selectively over any one of the teeth 45 of a rack cut in the edge of the upper, downwardly bent side of the upper slideway 17. The locking device 42 is in the form of a cage mounted for sliding by its extreme faces 42A, 42B on a rod 47 one extremity of which is fixed with a joint piece 48 capable of pivoting on the spindle 11. The locking device 42 is elastically centered on the rod 47 in the longitudinal direction in relation to an attached boss 51 of the said rod, by means of two opposed helical compression springs 52, 53 enclosed respectively between one of the lateral faces of the boss 51 of the rod and the corresponding extremity 42A or 42B of the locking device 42. Under the action of a return spring 46 the rod 47 is thrust to pivot on the spindle 11 in the clockwise direction (considered in FIG. 3) in order to cause engagement of the locking device 42 with the teeth 45 of the rack, as represented in FIG. 3. The locking device 42, 43 can be disengaged from the rack by means of a device comprising a lever 56, 56A pivotably mounted on the locking device 42, 43 by a small transverse spindle 57 (see also FIG. 4). The lever 56, 56A passes through the slideway 17, 18 in a slot 70 and comprises an end nose 58 capable of pushing downwards the free extremity of the rod 47, as represented in FIGS. 7 and 8, by a nose 58 which can engage in a notch 59 of the rod 47 with the purpose of ensuring relative longitudinal locking between the locking device 42, 43 and the rod 47, in order to set the pair of springs 52, 53 out of action.

It is appropriate that the user should be able to control the lever 56, 56A conveniently whatever is the longitudinal position of the seat, that is to say of the upper slideways 17, 18 in relation to the scissor lever suspension systems 3, 3A, 4, 4A. For this purpose the lever 56 and the corresponding lever 56A situated on the other side are connected by a cross member 61 of inverted U-shaped section on which a longitudinal rod 62 presses, the latter being further represented in two other positions 62' and 62" (FIG. 5), of which the two counter-angled extremities are pivotally mounted respectively in two bearings 63, 64 (FIG. 2) fixed against the vertical side pieces of two angle irons 65, 66 fixed flat by their horizontal sides on the top of the two slideways 17, 18 which they brace. In one angle of the rod 62 there is welded a transverse handle 67 which the user, sitting on the seat, can reach by the corresponding side, for example the right side in the example as represented.

The rod 62 and the handle 67 are fixed with one another and can rock about the axis of the bearings 63, 64. The cross member 61 carries a lug 60 which protrudes upwards and has a window 60' (FIG. 3) through which the rod 62 passes. The window 60' is transversely elongated to permit displacement of the rod 62 along the cross member 61 in its rocking about the axis of the bearings 63, 64. The dimension of the window 60' vertically is sufficient to permit free sliding of the cross member 61 on the rod 62 in the adjustment of longitudinal position and rocking of the cross member 61 in the vertical plane.

By means of the handle 67 it is possible to cause the rod 62 to occupy according to choice a high position (FIG. 3), an intermediate position (FIG. 6) and a low position (FIG. 7), in each of which it is locked elastically by a spring leaf 71 (FIGS. 2 and 5) fixed to the vertical side of the angle iron 65 and having an undulatory face which presses against the corresponding angle of the rod 62.

The elastic system for positioning the seat in the horizontal direction, which comprises inter alia the sliding locking device 42, 43, is equipped with a shock absorber 68 (FIG. 2) one extremity of which is articulated to the tab 43A of the locking device 43 (FIG. 2) and the other extremity of which is articulated on the spindle 12.

The operation of the assembly is as follows:

When the handle 67 is in the low position (FIG. 3) the pivoting levers 56, 56A are in the high position and their noses 58 are disengaged from the notches 59 of the rods 47; the locking devices 42, 43 subject to the action of the return springs 46 are engaged in the teeth 45 of the racks so that the upper chassis 2 carrying the seat can move horizontally, from front to rear and vice versa, as far as is permitted by the elastic positioning devices 42A, 42B, 51, 52, 53. The longitudinal forces to which the vehicle and consequently the lower chassis 1 are subjected are thus attenuated when they reach the upper chassis 2 and the user's seat. The comfort is further improved by the presence of the shock absorber 68 associated with the device for elastic positioning and shock absorption in the horizontal direction.

Figure 6:
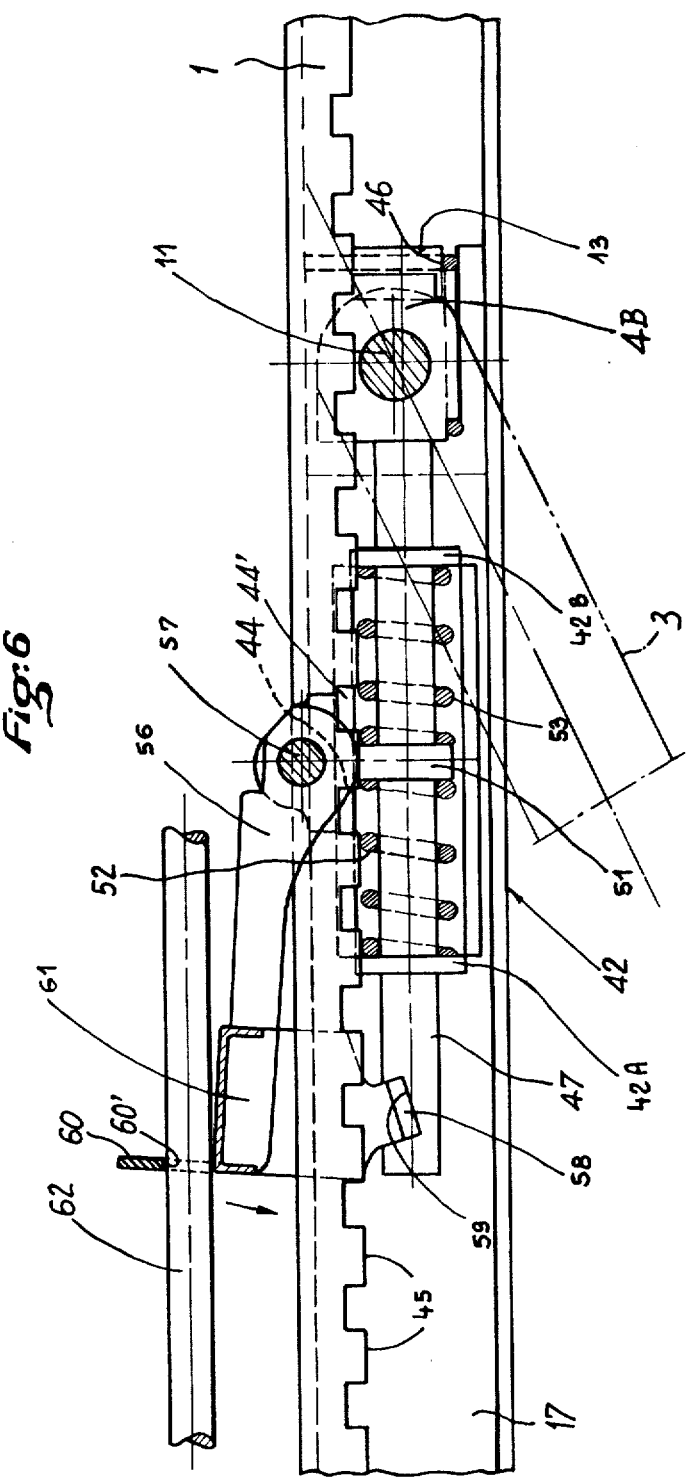
FIGS. 6 and 7 are views analogous with that in FIG. 3, in two different positions respectively.

If the handle 67 is raised a little to bring it into a second or intermediate position, which is that represented in FIG. 6, the levers 56, 56A pivot downwards by a certain amount so that their noses 58 engage just in the notches 59 of the rods 47, without causing these rods to descend, so that the locking devices 42, 43 are kept fixed with the rods 47 and, as they have remained engaged in the racks 45, the upper chassis, and consequently the seat, are rendered horizontally fixed with the rods 47 and consequently with the lower chassis 1. The action of the elastic positioning and shock absorption device is eliminated.

Finally, if the handle 67 is raised further to bring it into the third or upper position in FIG. 7 the pivoting levers 56, 56A descend a little more and push the rods 47 downwards, which has the effect of disengaging the locking devices 42, 43 from the racks 45. The upper slideways 17, and 18 and consequently the upper chassis 2 and the seat can then be displaced freely in the longitudinal direction, forward or rearward, at the wish of the user. Once this longitudinal adjustment is effected the user can then return the handle 67 either into the first low position (FIG. 3), or into the intermediate position (FIG. 6), according to whether he wishes to put the horizontal elastic positioning device into action or not.

The characteristics of the device for elastic positioning of the seat in the horizontal direction can be modified at will by imparting to the springs 52, 53 characteristics appropriate to each requirement and possibly characteristics which may not be the same for both springs with a view to taking account of the difference of the values which the positive accelerations supplied by the vehicle engines and the negative accelerations due to the braking forces may have. It is also possible to impart particular characteristics well adapted to each case to the shock absorber 68.

The invention is not of course limited to the form of embodiment as described and represented, which has been given by way of example; numerous modifications may be made thereto according to the envisaged applications, without thereby departing from its scope.

Thus for example it would be possible to supply a device for elastic positioning in the longitudinal direction to a vehicle seat support which is not equipped with vertical suspension means, or height adjustment means or longitudinal adjustment means, without departing from the scope of the invention.

I claim:

1. Vehicle seat support comprising: an upper chassis intended to receive a seat, support means for mounting said upper chassis on a vehicle, said upper chassis being longitudinally movable with respect to said support means, means for elastic damping of said upper chassis in the longitudinal direction, and means for fixing the mean longitudinal position of said upper chassis in relation to said support means; said elastic damping means being constituted by a first rigid element which is fixed in the longitudinal direction with one of the two structure elements constituted by said upper chassis and said support means, two second rigid element fixed in the longitudinal direction with the other of said two structure elements, said first rigid element being situated between said two second rigid elements, two elastic elements interposed between said first rigid element and said two second rigid elements respectively; said means for fixing the mean longitudinal position of said upper chassis in relation to said support means comprising a longitudinal toothed rack fixed with said upper chassis, and side pieces fastened with one of said rigid elements of said elastic damping means and engageable with said toothed rack to effect a longitudinal connection between said upper chassis and said support means through the intermediary of said elastic damping means.

2. Seat support according to claim 1, wherein said two other rigid elements are constituted respectively by the two extremities of a cage of elongated form and wherein said first rigid element is an intermediate shoulder of a rod on which said cage is mounted for longitudinal sliding movement, said elastic elements being constituted by two opposite helical springs fitted over said rod between said intermediate shoulder and said two extremities of said cage.

3. Seat support according to claim 1, further comprising means for making said first rigid element and said second rigid elements fixed with respect to one another in the longitudinal direction.

4. Seat support according to claim 2, wherein said side pieces pertain to a locking device movable vertically in relation to said support means and connected thereto in the longitudinal direction, said side pieces forming between them a notch capable of engaging selectively over one of the teeth of said longitudinal toothed rack fixed with said upper chassis, said seat support further comprising a return spring to urge said notch over one said teeth and a manual control to displace said locking device against the action of said return spring in the opposite direction to disengage it from said rack.

5. Seat support according to claim 4, wherein said cage constituted said movable locking device and said rod is connected to said support means in the horizontal direction, a lever being pivotally mounted on said cage to move said cage away from said rack under the action of said manual control.

6. Seat support according to claim 5, wherein said lever pivotally mounted on said cage has a nose and said rod has a matching notch engageable by said nose to immobilize said cage positively in relation to said fixed chassis.

7. Seat support according to claim 5, further comprising a cross piece which connects said two pivoting levers and a horizontal longitudinal rod which bears against said cross piece and is connected to said manual control for vertical movement together with said cross piece.

8. Seat support according to claim 6, wherein said manual control is adapted to selectively occupy three positions, namely: a first service position in which said cage is locked on said rack but said nose of said pivoting lever is disengaged from said rod; a second position for locking said elastic positioning means in which said cage is locked on said rack and said nose of said lever is engaged in said notch of said rod; and a third position for longitudinal adjustment of the seat in which said cage is disengaged from said rack while said nose of said lever is engaged in said notch of said rod.

9. Seat support according to claim 1, wherein a vertically adjustable elastic suspension system is associated with said support means.

10. Seat support according to claims 4 or 9 considered together, wherein said elastic suspension system is of the type comprising suspension levers articulated in scissors manner, and said locking devices for locking said upper chassis are pivotally mounted on the upper extremity of each of two matching said suspension levers situated on two opposite sides of the seat support assembly.

11. Seat support according to claim 9, further comprising a cross piece which connects said two pivoting levers and a horizontal longitudinal rod which bears against said cross piece and is connected to said manual control for vertical movement together with said cross piece.

* * * * *